United States Patent [19]

Lajoie et al.

[11] 3,979,814

[45] Sept. 14, 1976

[54] PIPE FITTING DEVICE

[76] Inventors: Bernard Lajoie, R.R. 3; Marcel Lajoie, R.R. 1, both of Sombra, Ontario, Canada

[22] Filed: Nov. 21, 1975

[21] Appl. No.: 634,011

[52] U.S. Cl. .................................................. 29/272
[51] Int. Cl.$^2$ ........................................ B25B 27/14
[58] Field of Search ...................... 29/237, 272, 282

[56] References Cited
UNITED STATES PATENTS

| | | | |
|---|---|---|---|
| 820,126 | 5/1906 | Phillips | 29/272 |
| 1,515,785 | 11/1924 | McDonald | 29/272 |

Primary Examiner—James L. Jones, Jr.

[57] ABSTRACT

A pipe fitting device is provided for use in guiding a coated pipe as this pipe is moved axially into an outer casing. The device includes a clamp adapted to frictionally and releasably engage the device on the outer casing, stop means engageable with the end of the outer casing to locate the device axially on the outer casing before using the clamp to engage the device on the outer casing, and roller means adapted on assembly of the device on the outer casing to engage the coated pipe and thereby guide this pipe as it is moved axially into the outer casing.

4 Claims, 5 Drawing Figures

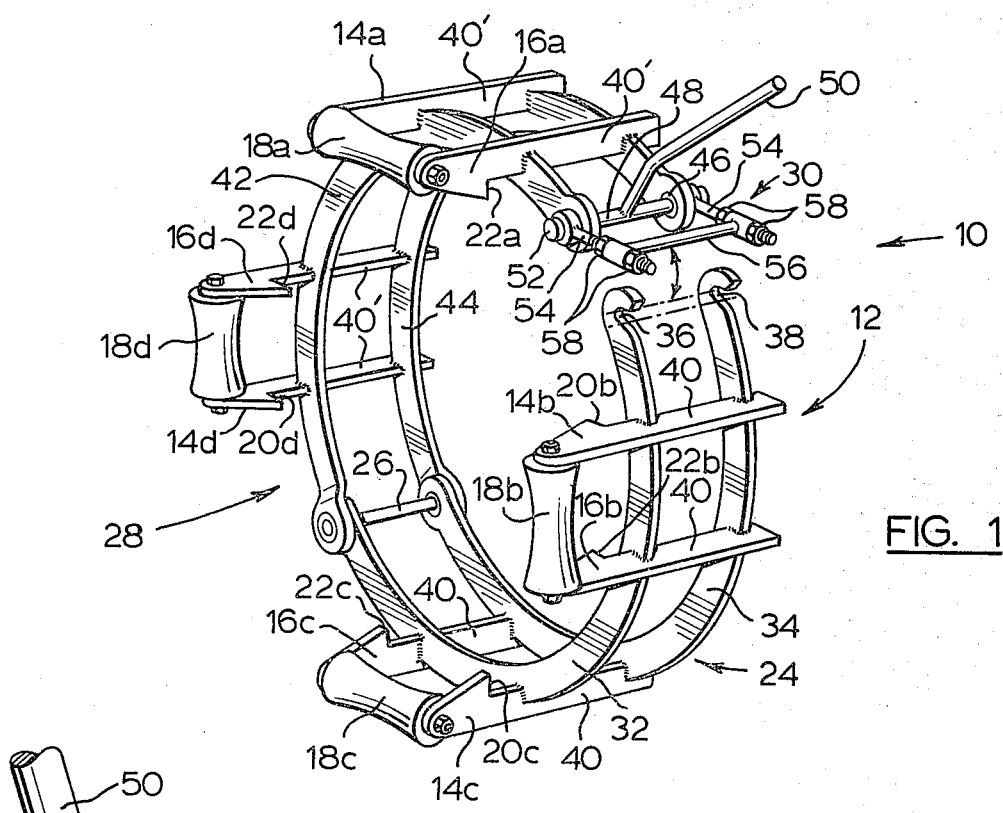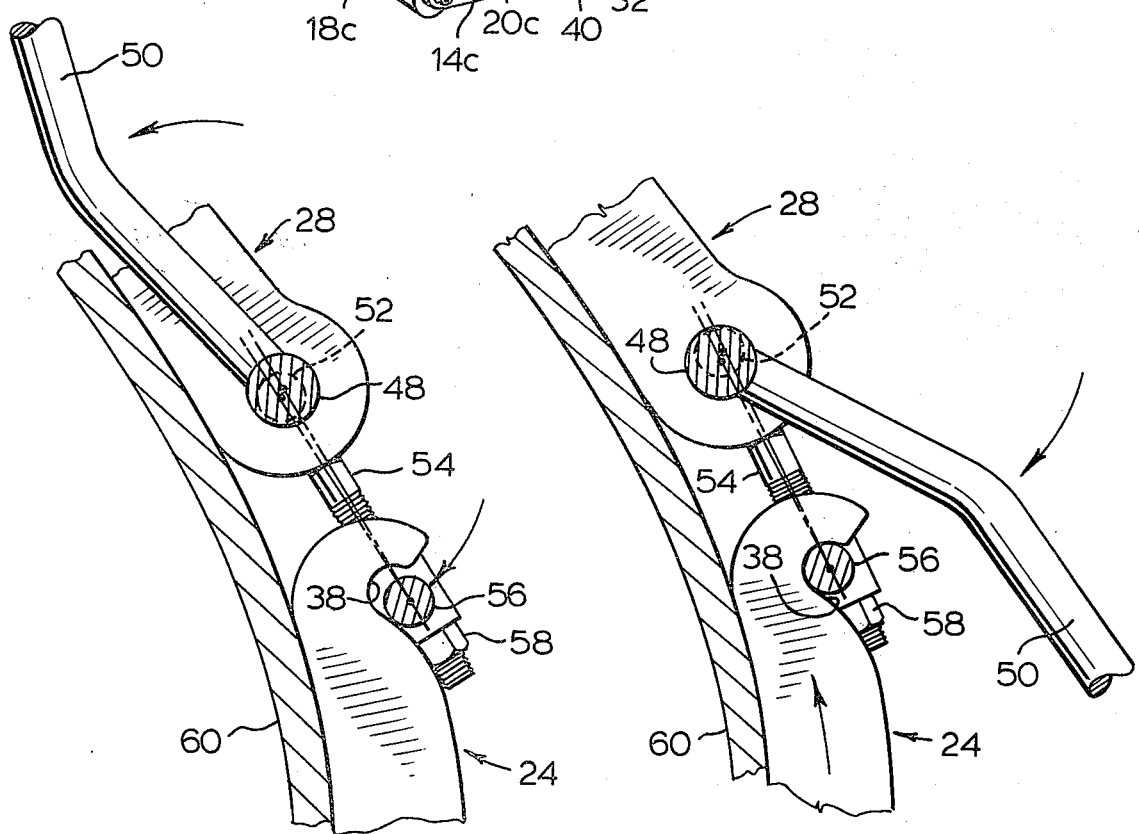

PIPE FITTING DEVICE

This invention relates to a device for use in guiding a coated pipe into an outer casing, and more particularly for such use when applied to the construction of pipelines.

During the construction of pipelines, it is commonly necessary to engage a coated pipe into an outer casing. This is generally achieved by inserting the pipe very slowly and with extreme care to minimize damage to the coating on the pipe. Unfortunately, any damage done is not evident because the damage is hidden as the section of coated pipe is slid into the outer casing. In the event that the damage is evident, the coated pipe must be removed and repaired resulting in lost time and added expense.

The purpose of the present invention is to provide a device which facilitates the engagement of coated pipe into an outer casing of the type used in pipeline construction. However, it will be appreciated that the device has uses wherever a pipe is to be inserted into an outer casing no matter what the size of the pipe.

Accordingly, the invention provides a pipe fitting device engageable on an end of an outer casing for use in guiding a coated pipe into the outer casing. The device comprises: clamp means adapted to frictionally and releasably engage the device on the outer casing; stop means coupled to the clamp means and engageable with said end of the outer casing to locate the device axially on the outer casing before using the clamp means to attach the device to the outer casing; and roller means coupled to the clamp means and adapted on assembly of the device on the outer casing to engage the coated pipe and thereby guide the pipe as this pipe is moved axially into the outer casing.

The invention will be better understood with reference to the drawings taken in combination with the following description, and in which FIG. 1 is a perspective view of the device before assembly on an outer casing;

FIGS. 2 and 3 illustrate two positions of a locking assembly used in the device;

Figure 4:
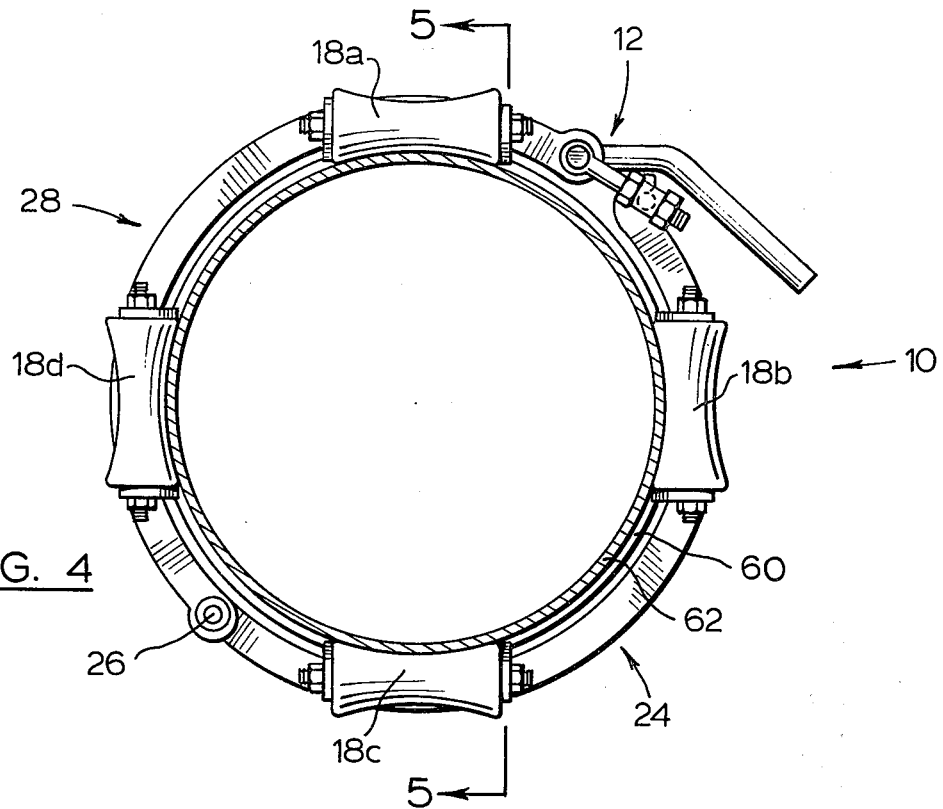
FIG. 4 is an end view of the device assembled and in use to guide a coated pipe into the outer casing.

The preferred embodiment of the invention is as shown in the drawings and will be described with reference initially to FIG. 1. As seen in this figure, the device is generally cylindrical about a longitudinal axis, and it will therefore be convenient to use the terms "axial", "longitudinal", and "radial" as they would normally apply to a cylindrical object.

As seen in FIG. 1, a pipe fitting device is indicated generally by the numeral 10 and includes a clamp assembly 12 from which are dependent four pairs of axial projections 14a, 16a; 14b, 16b; 14c, 16c; and 14d, 16d. These pairs of projections support respective transverse rollers 18a, 18b, 18c, and 18d. The clamp assembly 12 facilitates attaching the device to an outer casing and each of the axial projections defines one of the respective step-like stops such as the stops 20b, 22b on the respective projections 14b, 16b. These stops extend radially inwards for engagement with the end of the outer casing.

Once the device is assembled on the outer casing, the rollers 18a, 18b, 18c, and 18d are in position for guiding the coated pipe as will be described.

Further details of the structure will now be described with reference initially to FIG. 1, and subsequently the use of the device will be described with reference to FIGS. 4 and 5.

As seen in FIG. 1, the clamp 12 consists of a first half ring 24 connected by a pivot pin 26 to a second half ring 28. The clamp is completed by a locking assembly 30 which co-operates with the half rings 24, 28 to bring the device into locking engagement on the outer casing.

The first half ring consists of a pair of similar half ring sections 32, 34 which receive the pivot pin 26 at a first of their ends and which define rounded and angled recesses 36, 38 at a second of their ends. Intermediate these first and second ends, the half ring sections 32, 34 are welded to four transverse spacers 40 which are conveniently formed as extensions of the respective projections 14b, 16b, and 14c, 16c.

The second half ring 28 is similar in general shape to half ring 24 but differs in that the first ends of a pair of half ring sections 42, 44 are cranked outwardly to receive the pivot pin 26 with the remainder of these sections in coplanar alignment with corresponding half ring sections 32, 34. Also, the second ends of the sections 42, 44 differ from the second ends of the sections 32, 34 in that sections 42, 44 are enlarged to receive simple journal bearings 46 (one of which is seen in FIG. 1) to carry a shaft 48 of the locking assembly 30. A lever 50 is welded to the centre of the shaft 48 for operating the locking device and spacers 40' are used.

Locking assembly 30 will now be more fully described with reference to FIGS. 1 to 3. The shaft 48 extends beyond the journal bearings 46 and terminates in eccentric end portions 52 which carry respective tie rods 54. A cross bar 56 includes cylindrical end portions engaged on the tie rods 54 and held in place by nuts 58 which allow the cross bar 56 to be adjusted along the threaded tie rods 54.

As seen in FIG. 2, when the lever 50 is in a release position, eccentric end portion 52 is displaced outwardly with respect to the axis of the shaft 48. By contrast, and as seen in FIG. 3, when the lever 50 is moved into an engaged position, the eccentric end portion 52 has been moved inwardly with respect to the axis of the shaft 48 thereby drawing the tie rods 54 towards the second half ring 28. FIG. 3 also shows that the cross bar 56 fits snugly in the angled recesses 36, 38 so that the result of moving the lever 50 into the engaged position is to draw the clamp 12 into firm engagement with an outer casing 60.

It will be appreciated that if the lever fails to draw the clamp into firm engagement, an adjustment can be made using the nuts 58 with the lever in the disengaged position as shown in FIG. 2. Some trial and error may be necessary to obtain the best engagement.

Figure 5:
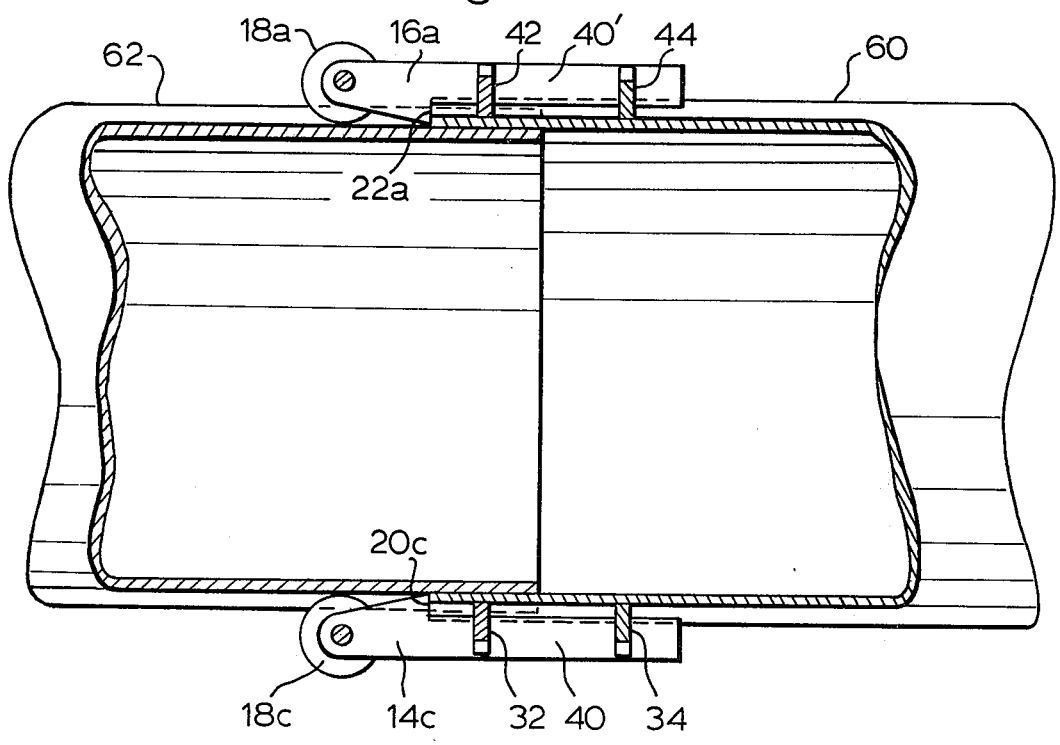
FIG. 5 is a sectional view on line 5 — 5 of FIG. 4.

Reference is now made to FIGS. 4 and 5 to describe the use of the device. Initially, the device is positioned over an end of the outer casing 60 with the stops 20a, 22a, etc. in engagement with the end of the outer casing. While maintaining this position, the locking assembly 12 is first adjusted if necessary and then engaged by moving the lever into the engaged position as originally described with reference to FIG. 3 and as shown in FIG. 4. Next, because the rollers are chosen to support a particular diameter of coated pipe, such a coated pipe 62 can be aligned with the outer casing and then moved axially guided by the rollers to enter the outer casing. The rollers continue to guide the coated pipe to limit the possibility of damage as this pipe is engaged in the outer casing. The initial entry of the coated pipe is illustrated in FIG. 5 which is a sectional view taken to one side of the rollers 18a, 18c giving the impression that these rollers are not in contact with the coated pipe. However, a close examination of this figure will show that it illustrates the support and guidance provided by these rollers.

After the coated pipe has been engaged in the outer casing, the device 10 can be removed by lifting the lever 50 and causing the cross bar 56 to disengage from the angled recesses 36, 38. The half rings 24, 28 can then be pivoted about the pivot pin 26 so that the device can be removed without having to slide the device off the end of a pipe section. This feature can be advantageous in certain circumstances where such axial movement is not possible.

Although the preferred embodiment shown in the drawings includes eight stops for locating the device on the end of the outer casing, a minimum of three stops can be used. Similarly, the number of rollers can be reduced to three provided of course they are sufficiently spaced circumferentially that they provide adequate support for the coated pipe.

Further modifications can be made. For instance, it is not essential that the stops form part of the projections which support the rollers and, if preferred, the stops could be separate structures. Similarly, any convenient locking assembly can be used to provide the compressive force necessary to lock the clamp on the outer casing.

In the preferred embodiment, the structure is primarily of steel with the rollers of hard rubber or other similar non-marring material. Here again, any suitable materials can be used consistent with guiding the coated pipe without causing damage as the pipe passes through the rollers.

Although the present invention is directed primarily to uses associated with pipeline assembly, there may be other uses where the outer casing and coated pipe are not cylindrical. It will be evident that some variation can be accommodated provided that the rollers are suitably shaped and positioned to provide adequate support.

What we claim is:

1. A pipe fitting device for use in inserting a cylindrical coated pipe into a cylindrical outer casing of the type used in pipelines, the pipe fitting comprising:
   first and second half rings having respective first and second ends;
   means pivotally connecting the half rings to one another at said first ends of the half rings;
   a locking assembly coupled to said second ends of the half rings for releasably connecting these ends to one another to fit the device over an end of the outer casing substantially concentrically about the longitudinal axis of the outer casing;
   the half rings defining at least three circumferentially spaced radial stops, each of the stops extending inwardly to engage said end of the outer casing for thereby locating the device axially of the outer casing; and
   at least three transverse rollers coupled to the half rings and spaced axially from said radial stops for engagement with the coated pipe on assembly of the device on the outer casing to guide the coated pipe as this pipe is moved axially into the outer casing.

2. A pipe fitting device engageable on an end of an outer casing for use in guiding a coated pipe into the outer casing, the device comprising:
   clamp means adapted to frictionally and releasably engage the device on the outer casing;
   stop means coupled to the clamp means and engageable with said end of the outer casing to locate the device axially on the outer casing before using the clamp means to attach the device to the outer casing; and
   roller means coupled to the clamp means and adapted on assembly of the device on the outer casing to engage the coated pipe and thereby guide the pipe as this pipe is moved axially into the outer casing.

3. A device as claimed in claim 2 in which the clamp means comprises: first and second half rings; means pivotally coupling the rings to one another at a respective first of the ends of the half rings; and a locking assembly attached to one of the first and second half rings and engageable with the other of the half rings to draw the half rings into said engagement with the outer casing.

4. A device as claimed in claim 3 in which the locking assembly includes a shaft having eccentric end portions, tie rods mounted on the end portion, and a cross bar attached to the tie rods, and in which said other end of the half rings defines a pair of angled recesses adapted to receive the cross bar so that rotation of the shaft moves the second ends of the half rings towards and away from one another.

* * * * *

UNITED STATES PATENT OFFICE
CERTIFICATE OF CORRECTION

Patent No. 3,979,814      Dated September 14, 1976

Inventor(s) Bernard Lajoie et al.

It is certified that error appears in the above-identified patent and that said Letters Patent are hereby corrected as shown below:

On the Cover Sheet, Item [30] should read:

Canada      214,390      November 21, 1974.

Signed and Sealed this

Seventh Day of December 1976

[SEAL]

Attest:

RUTH C. MASON
*Attesting Officer*

C. MARSHALL DANN
*Commissioner of Patents and Trademarks*